June 2, 1942.  L. A. TAGLIABOSCHI  2,285,313
MOTORCYCLE STAND
Filed Feb. 6, 1939  4 Sheets-Sheet 1

INVENTOR
Louis A. Tagliaboschi
BY
Harry B. Kook
ATTORNEY

June 2, 1942.   L. A. TAGLIABOSCHI   2,285,313
MOTORCYCLE STAND
Filed Feb. 6, 1939    4 Sheets-Sheet 2
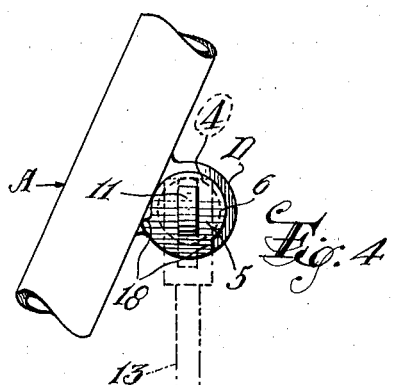
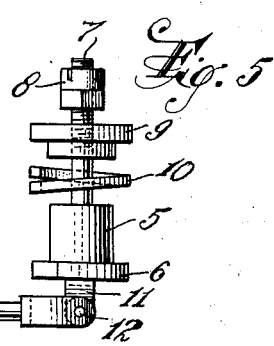
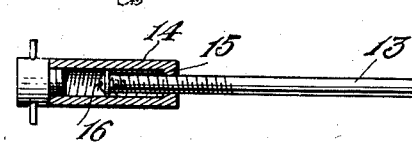
INVENTOR
Louis A. Tagliaboschi,
BY
Harry B. Rook.
ATTORNEY

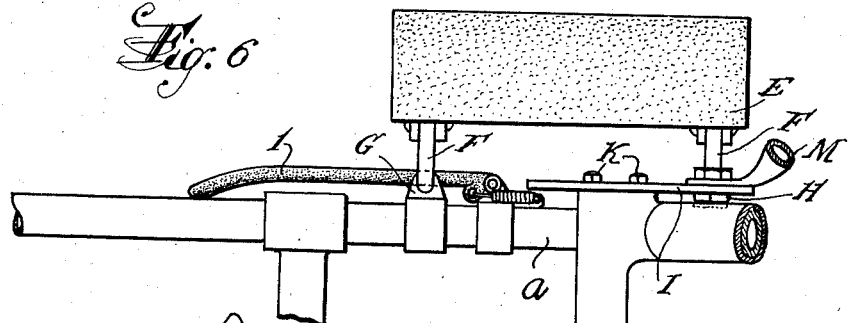
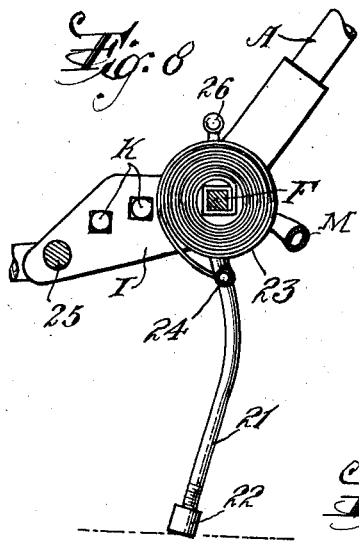
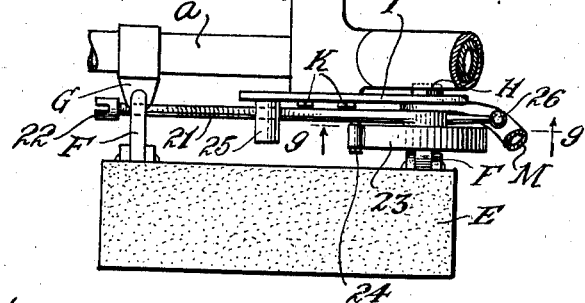
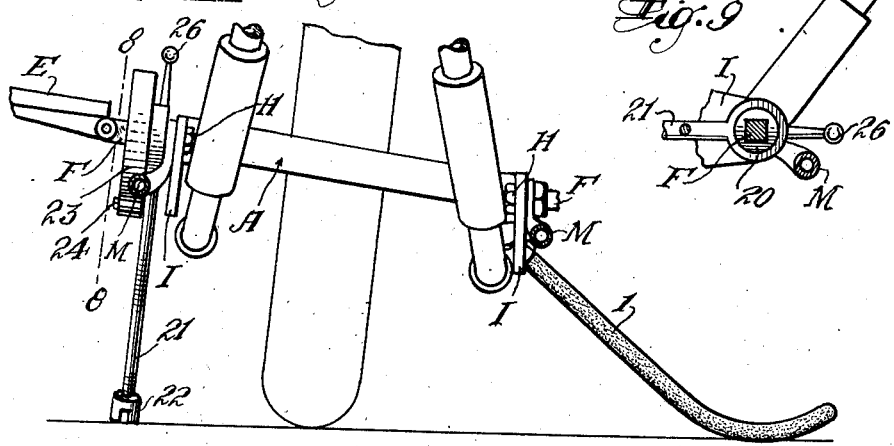

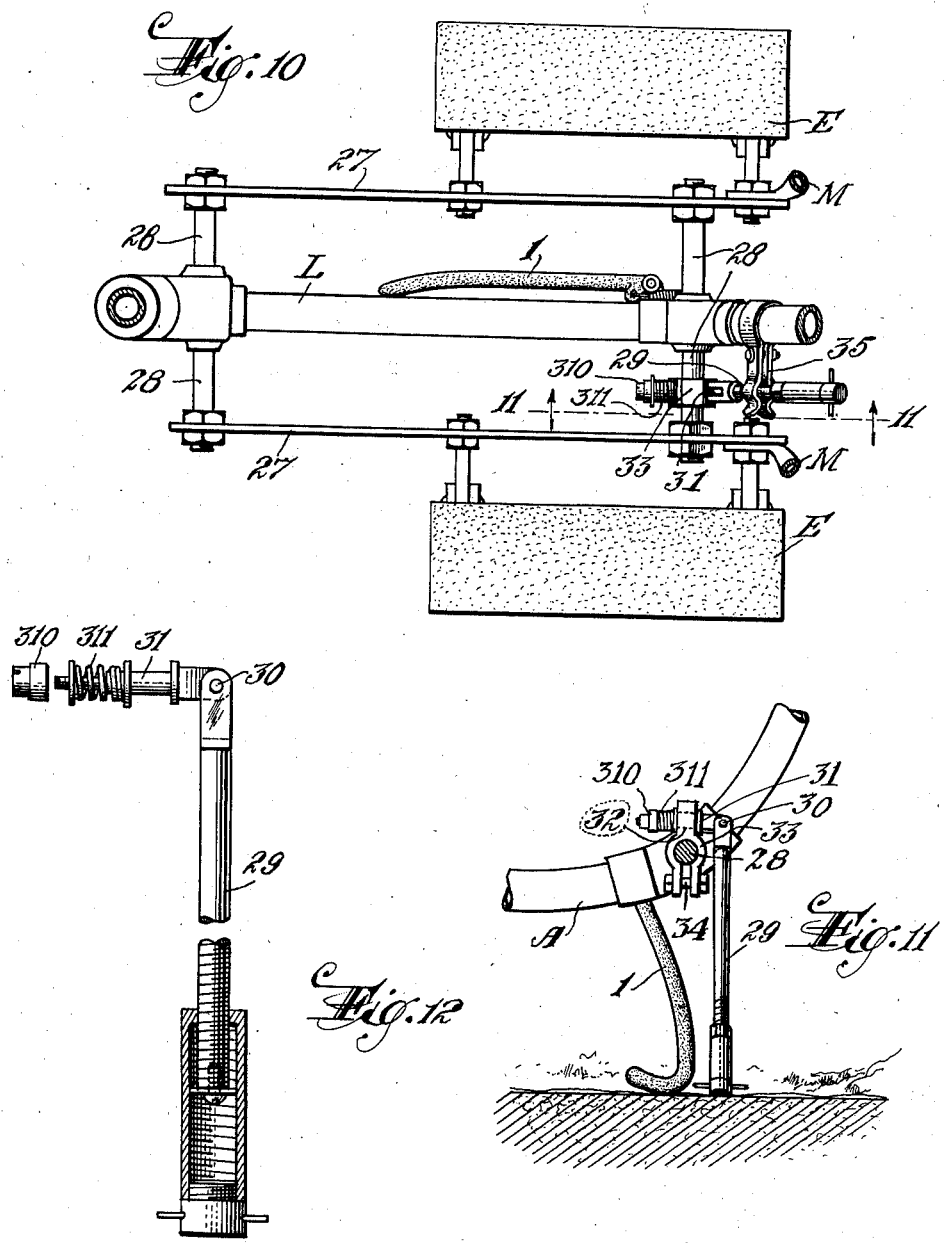

Patented June 2, 1942

2,285,313

UNITED STATES PATENT OFFICE 2,285,313

MOTORCYCLE STAND

Louis A. Tagliaboschi, Metuchen, N. J.

Application February 6, 1939, Serial No. 254,842

3 Claims. (Cl. 280—303)

Motorcycles generally are supplied with a rear stand for supporting the cycles with their rear wheels off the ground, and also have a prop or stand on the left-hand side of the forward portion, commonly called the "jiffy stand," for temporarily holding the cycle in upright position but with both the front wheel and the rear wheel on the ground. So far as I know, no provision has been made for easily and quickly elevating and holding the forward end of the cycle in elevated position with the front tire off the ground or floor on which the cycle may be standing. Therefore, a prime object of the invention is to provide a novel and improved stand whereby the forward end of the machine may be easily and quickly elevated without the necessity of the operator lifting the whole weight of said forward end portion, and said forward end can be firmly supported in elevated position with the front wheel off the ground, to facilitate changing of the front tire or other repairs on the forward portion of the cycle, or to relieve the front tire of the weight of the cycle.

Another object is to provide a prop on the right-hand side of the forward portion of a motorcycle to cooperate with said "jiffy stand" on the left-hand side, whereby the cycle can be easily and quickly tilted out of its normal vertical plane on said jiffy stand to raise the front tire off the ground, and thereafter said prop can be moved into position to hold the cycle with the front tire so elevated.

A further object is to provide novel and improved means for adapting the prop for use with motorcycles of various types or constructions, whereby the invention practically can be utilized wherever needed.

Other objects, advantages and results of the invention will appear from the following description when read in conjunction with the accompanying drawings in which Figure 1 is a side elevational view of a motorcycle embodying a stand constructed in accordance with my invention, portions of the motorcycle being omitted and other portions being shown in dot and dash lines for clearness in illustration.

Figure 2 is an enlarged fragmentary transverse vertical sectional view taken on the line 2—2 of Figure 1.

Figure 3 is a fragmentary horizontal sectional view taken on the line 3—3 of Figure 1.

Figure 4 is an enlarged end elevational view of the pivot bolt for the prop, viewing the same from the line 4—4 of Figure 3, portions of the prop being shown in dot and dash lines.

Figure 5 is a detached plan view of the prop and the pivot bolt, with portions broken away and shown in section.

Figure 6 is a view similar to Figure 3 showing a modified form of the prop and the mounting therefor, with the stand in inoperative position.

Figure 7 is a view similar to Figure 2 illustrating the structure shown in Figure 6 with the stand in operative position.

Figure 8 is a sectional elevational view on the line 8—8 of Figure 7.

Figure 9 is a similar view on the line 9—9 of Figure 6.

Figure 10 is a view similar to Figure 3 showing a modification of the invention applied to another type of motorcycle and illustrating the stand in inoperative position.

Figure 11 is a fragmentary sectional elevational view on the line 11—11 of Figure 10 showing the stand in operative position, and Figure 12 is a detached side elevational view of the prop of my stand illustrated in Figures 10 and 11.

Specifically describing the embodiment of the invention illustrated in Figures 1 to 5 inclusive, the reference character A designates the so-called "double loop" frame of a motorcycle of known construction formed with two side sections or loops $a$ and having a front wheel B and a rear wheel C mounted thereon in the usual manner. The front wheel, as usual, is mounted on an axle in the fork that is journaled on the main frame A. At the left-hand side of the frame and adjacent the front end of the cycle, or at least at the side of the center of the length of the cycle toward the front end, is mounted the usual "jiffy stand" which constitutes a prop 1 pivotally mounted at one end as at 2 on one loop $a$ of the frame and adapted selectively to be moved into an out-of-the-way inoperative position above the ground as shown by dot and dash lines in Figure 3 and to be moved into operative position to extend downwardly and outwardly from the frame with its other end in contact with the ground as shown by solid lines in Figures 1, 2 and 3. Preferably a spring 3 is connected to the prop in such a manner as to hold it in both its operative and inoperative positions. Such a stand is commonly found on motorcycles for temporarily supporting the cycle in approximately upright position with both wheels on the ground.

In accordance with my invention I provide means to cooperate with the jiffy stand or its equivalent for easily and quickly elevating the front end of the cycle off the ground without the necessity of lifting the whole weight of the front end of the cycle, and for holding the cycle in such elevated position. As shown, I provide a second prop at the right-hand side of the front portion of the cycle to be selectively located in inoperative out-of-the-way position above the ground and moved into operative position in contact with the ground.

One form of the invention utilizes the usual boss D provided on the frame of the cycle for connection thereto of a sidecar. This boss is located behind the front wheel and below the axle thereof and has an opening 4 which is disposed horizontally and transversely of the frame A when said frame is upright or in a vertical plane. Within the opening 4 of this boss I rotatably mount a pivot bolt 5 which has a flanged head 6 to abut one end of the boss and its opposite end threaded to receive a nut 8 for clamping the bolt in the boss. Preferably a washer 9 is mounted on the threaded end of the bolt and a spring 10 is interposed between the washer 9 and the end of the boss opposite the flange 6 to take up looseness. At the headed end of the bolt is an arm 11 to which is pivoted at 12 one end of the shank 13 of the prop. The other end of the shank has an adjustable foot 14 screw threaded thereon for varying the effective length of the prop, the foot being tubular and interiorly threaded and having a shoulder 15 at one end to abut a stop screw 16 in the corresponding extremity of the shank to limit movement of the foot in one direction on the shank.

In operation, normally the shank 13 of the prop is swung upwardly about the pivot 12 and the bolt 5 into an out-of-the-way inoperative position alongside of the frame of the cycle, and a suitable spring clip 17 may be provided for holding the prop in this position as shown by dot and dash lines in Figure 2. Normally the jiffy stand prop 1 is also swung into inoperative position off the ground as shown in Figure 3. When it is desired to elevate the front end of the cycle, first the jiffy stand prop is swung into operative position as shown in Figures 1 and 2, after which the cycle is tilted slightly out of its vertical plane on the rear tire and the jiffy stand. This results in raising the front tire B out of contact with the ground as shown in Figure 1. Thereupon, the prop 13 is swung downwardly into operative position as shown in Figures 1 and 2 with its free end in contact with the ground, whereupon the cycle is released by the operator. The prop 13 then holds the cycle in tilted position (shown in Figures 1 and 2), the two props cooperating to hold the cycle so elevated. The foot 14 may be adjusted to compensate for different degrees of elevation of the frame or different sizes of front tires and so forth.

Preferably the flanged head 6 of the pivot bolt 5 will have two stop lugs 18 to engage the frame A and limit movement of the prop into its operative and inoperative positions, especially to hold the prop against pivotal movement under the weight of the cycle when the prop is in operative position.

A modification of the invention is shown in Figures 6 to 9 inclusive where the right side prop is mounted on the foot board support of the cycle instead of directly on the frame as shown in Figures 1 and 2, this form of the invention being especially intended for use with types of cycles that do not have the equivalent of the boss D. In this form of the invention, the foot boards E of the cycle are pivotally connected to bracket arms F, and one bracket arm is connected to the frame A as at G, while the other bracket arm is connected at H to a plate I that is bolted to the frame at K and serves also as a support for the brake pedal.

In accordance with this form of the invention, the forward bracket arm at the right side of the cycle is located behind the front wheel B and below the axle thereof and is provided with a bearing bushing 20 on which is rotatably mounted one end of a prop 21 the other end of which has a foot 22. For influencing and holding the prop in an out-of-the-way position alongside the frame of the cycle and above the ground, I utilize a spiral spring 23 which has one end connected to the foot board bracket arm F and the other end connected at 24 to the prop. Preferably a stop lug 25 is provided on the plate I for limiting movement of the prop into its inoperative position.

The frame of the cycle has the same type of jiffy stand 1 illustrated in Figures 1 to 3 inclusive, and the operation of this form of the invention is substantially the same as that hereinbefore described. Normally the jiffy stand and prop 21 are disposed in inoperative position off the ground as shown in Figure 6. When it is desired to elevate the front end of the cycle, the jiffy stand is first thrown into operative position, and after tilting of the cycle on the jiffy stand, the prop 21 is swung downwardly into contact with the ground as shown in Figure 7, whereby to cooperate with the jiffy stand in holding the cycle in elevated position. Preferably a handle 26 is provided on the pivoted end of the prop 21 to facilitate swinging of the prop into operative position.

Another form of the invention is shown in Figure 10 where the frame L of the cycle is of different construction, being of the "single loop" type instead of the "double loop" type shown in Figures 1 to 7 inclusive. Here a plate 27 is mounted on each side of the frame L by bolts 28, and the foot boards E are mounted on the plates 27. The cycle has a jiffy stand which may be the same as the ordinary one heretofore described, and the other prop of my invention is mounted on the right side front bolt 28 between the corresponding plate 27 and the frame L.

As shown, the shank 29 of the prop is pivotally connected at 30 to one end of a pivot bolt 31 which is located behind the front wheel and below the axle thereof and is rotatably mounted in an opening 32 in a split bearing bracket 33 that is clamped around the bolt 28 by a bolt 34. The bolt 31 is held in the bearing bracket 33 by a nut 310, and a spring 311 is provided to take up looseness in the connection between the bolt and the bracket. The opening 32 is disposed horizontally and approximately parallel to the longitudinal plane of the frame of the cycle when the latter is in upright position, and the shank of the prop is normally swung into inoperative position and held by a spring clip 35 as shown in Figure 10.

The operation of this form of the invention is substantially the same as the operation of the form illustrated in Figures 1 to 3 inclusive, the jiffy stand and the prop 29 normally being in inoperative position. To elevate the cycle, the jiffy stand is first swung into operative position, the cycle is then tilted on the jiffy prop, after which the prop 29 is swung into operative position as shown in Figure 11 so as to cooperate with the jiffy stand in holding the front end of the cycle elevated with the front tire off the ground.

It will be observed that in the forms of the invention shown in Figures 6 and 10, the bracket arms F of the foot boards and the bolts 28 constitute portions projecting laterally from the frames of the cycles when the frames are upright, and the props are pivotally mounted on these laterally projecting portions. In the form of Figure 6, the prop 21 is pivoted to swing about an axis that is longitudinal of said projecting portion, while in the form of Figure 10, the prop swings about an axis perpendicular to said laterally projecting portion. In the forms shown in Figures 1 and 10, shanks of the props are pivotally connected to the respective bolts 5 and 31 on axes perpendicular to the axes of the respective bolts.

The particular relation of the axes of the bolts 5 and 31 to the pivots of the corresponding shanks on said bolts is especially important to permit freedom of adjustment of the shanks, particularly to clear the safety guards M usually included in modern motorcycles.

While I have shown and described the invention as embodied in certain details of structure and as utilized in connection with several different structures of motorcycles, it should be understood that this is primarily for the purpose of illustrating the principles of the invention. The details of construction of the props may be widely modified and changed, and the invention may be used in connection with cycles of other constructions, without departing from the spirit or scope of the invention.

Having thus described my invention, what I claim is:

1. The combination with a motorcycle having a frame, a rear wheel and a front wheel journaled on an axle in a steering fork, of a prop connected to the lower portion of the frame behind the front wheel and steering fork to swing selectively into an out-of-the-way position alongside said frame or to extend downwardly and laterally from one side of the frame to contact with the ground a substantial distance outwardly of the frame and support the frame against falling from upright position in one direction, said prop being related to said frame so that when the prop is in contact with the ground said frame may be tilted out of its normal vertical plane on said prop and one wheel to elevate one end of the frame and raise the wheel thereon from the ground, and a second prop separate from and independent of the first prop and connected to said lower portion of the frame behind the front wheel and the steering fork to swing selectively into an out-of-the-way inoperative position alongside said frame or to project downwardly into operative position in contact with the ground at the other side of said frame when said end of the frame is elevated, whereby to hold the frame and said wheel so elevated, said props being capable of operation individually and independently of each other.

2. The combination with a motorcycle having a frame, a rear wheel and a front wheel journaled on an axle in a steering fork, of a prop connected to the lower portion of the frame behind the front wheel and steering fork to swing selectively into an out-of-the-way position alongside said frame or to extend downwardly and laterally from one side of the frame to contact with the ground a substantial distance outwardly of the frame and support the frame against falling from upright position in one direction, said prop being related to said frame so that when the prop is in contact with the ground said frame may be tilted out of its normal vertical plane on said prop and one wheel to elevate one end of the frame and raise the wheel thereon from the ground, and a second prop separate from and independent of the first prop and connected to said lower portion of the frame behind the front wheel and the steering fork to swing selectively into an out-of-the-way inoperative position alongside said frame or to project downwardly into operative position in contact with the ground at the other side of said frame when said end of the frame is elevated, and a spring normally actuating said second prop into said out-of-the-way inoperative position, said second prop being held in its operative position against actuation by said spring by contact of the prop with the ground, and said props being capable of operation individually and independently of each other.

3. The combination with a motorcycle having a frame, a rear wheel and a front wheel journaled on an axle in a steering fork, of a prop pivotally connected to the lower front portion of the frame behind the front wheel and steering fork to swing selectively into an out-of-the-way position alongside said frame or to extend downwardly and laterally from one side of the frame to contact with the ground a substantial distance outwardly of the frame and support the frame against falling from upright position in one direction, said prop being related to said frame so that when the prop is in contact with the ground said frame may be tilted out of its normal vertical plane on said prop and said rear wheel to elevate the front end of the frame and raise said front wheel from the ground, and a second prop separate from and independent of the first prop and pivotally connected to the lower front portion of said frame behind said front wheel on an axis approximately perpendicular to the general plane of said frame to swing selectively into an out-of-the-way inoperative position alongside said frame or to project downwardly into operative position in contact with the ground at the other side of the said frame when the front end of the frame and said front wheel are elevated, whereby to hold the frame and said front wheel so elevated, and a spring for normally actuating said second prop into said out-of-the-way position, said props being capable of movement into and out of operative position individually and independently of each other.

LOUIS A. TAGLIABOSCHI.